March 2, 1971 J. C. W. BAKERMANS 3,566,464

APPARATUS AND METHOD FOR MOUNTING WIRE WRAP PINS ON CIRCUIT BOARDS

Filed Dec. 5, 1968 7 Sheets-Sheet 1

*INVENTOR*

JOHANNES C.W. BAKERMANS

BY Whittemore, Hulbert & Belknap

*ATTORNEYS*

INVENTOR
JOHANNES C. W. BAKERMANS

BY Whittemore, Hulbert + Belknap
ATTORNEYS

March 2, 1971 J. C. W. BAKERMANS 3,566,464

APPARATUS AND METHOD FOR MOUNTING WIRE WRAP PINS ON CIRCUIT BOARDS

Filed Dec. 5, 1968 7 Sheets-Sheet 3

INVENTOR
JOHANNES C. W. BAKERMANS

BY Whittemore, Hulbert + Belknap
ATTORNEYS

INVENTOR
JOHANNES C. W. BAKERMANS

BY Whittemore, Hulbert + Belknap
ATTORNEYS

INVENTOR
JOHANNES C. W. BAKERMANS

BY Whittemore, Hulbert + Belknap
ATTORNEYS

INVENTOR.
JOHANNES C. W. BAKERMANS
BY Whittemore,
Hulbert + Belknap
ATTORNEYS

INVENTOR
JOHANNES C. W. BAKERMANS

BY Whittemore, Hulbert + Belknap
ATTORNEYS 3,566,464
Patented Mar. 2, 1971

3,566,464

APPARATUS AND METHOD FOR MOUNTING WIRE WRAP PINS ON CIRCUIT BOARDS

Johannes C. W. Bakermans, New Cumberland, Pa., assignor to Berg Electronics, Inc., New Cumberland, Pa.

Filed Dec. 5, 1968, Ser. No. 781,421
Int. Cl. H05k 3/00, 13/04
U.S. Cl. 29—625 20 Claims

ABSTRACT OF THE DISCLOSURE

Apparatus and method for simultaneously mounting a number of wire wrap pins in a predetermined pattern on a circuit board. The pins are severed from a carrier strip and fall down guide tubes to a plate in which they are held in the desired pattern. The plate is then lowered and a circuit board is positioned on the plate with a pin-receiving hole located above each pin in the plate. The plate is then raised to move the circuit board up against a second fixed plate and drive the pins into their respective circuit board holes.

The invention relates to an improved method and apparatus for simultaneously mounting a number of wire wrap pins on a circuit board in a predetermined pattern. While other machines such as those disclosed in U.S. Pats. Nos. 2,814,802, 2,970,370 and 3,067,902 have been proposed for performing this operation, the invention represents an improvement over the prior machines in terms of reliability, efficiency and speed of operation.

A number of wire wrap pins are severed from a carrier strip by an improved cut-off unit and fall down drop tubes and through a first plate into recesses in a plate held against the bottom of the first plate. The ends of the drop tubes are arranged in the pattern of the pin-receiving holes in the circuit board to which the pins are to be attached. The second plate is then lowered and a circuit board is positioned on the top of the second plate with a pin-receiving hole above each pin in the plate. The second plate is then raised to sandwich the board against the bottom of the first plate and drive the pins in the second plate through the circuit board holes in the circuit board to form a tight driven fit therewith. The upper ends of the pins project into the passages in the first plate through which the pins fell as they were loaded into the second plate. The second plate is then lowered to end the cycle of operation, following which the operator may remove the circuit board with the pins attached thereto from the apparatus.

Other objects and features of the invention will become apparent as the description proceeds, especially when taken in conjunction with the accompanying drawings illustrating a preferred embodiment of the invention, wherein.

Figure 19:
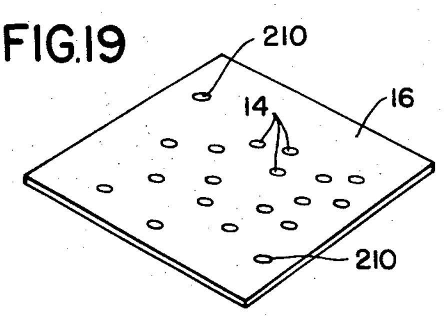
Figure 12:
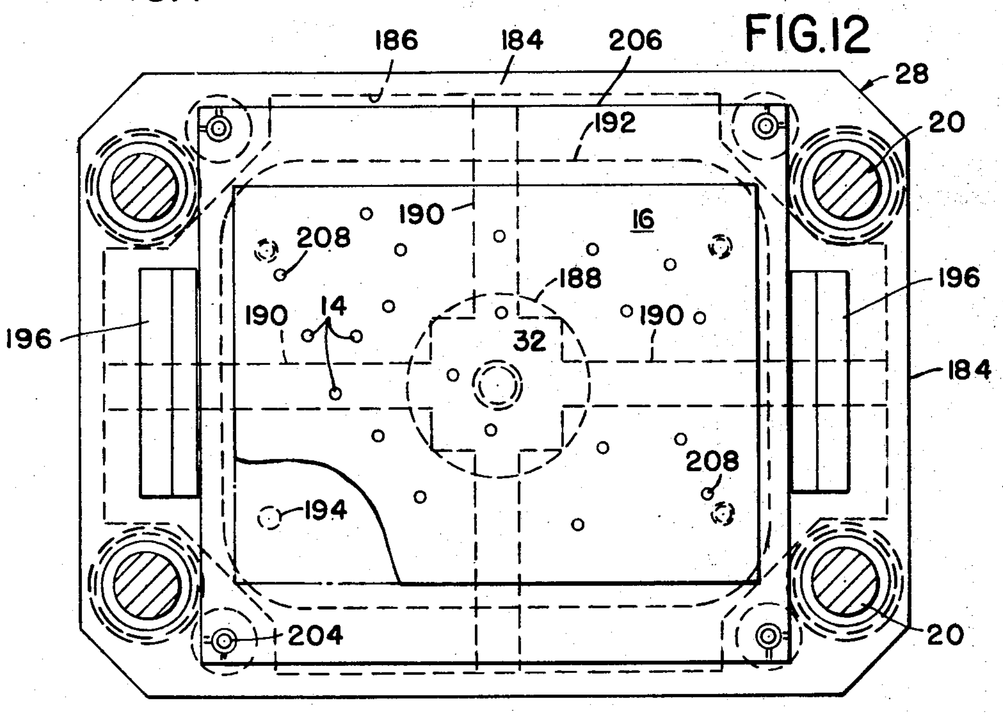
Figure 10:
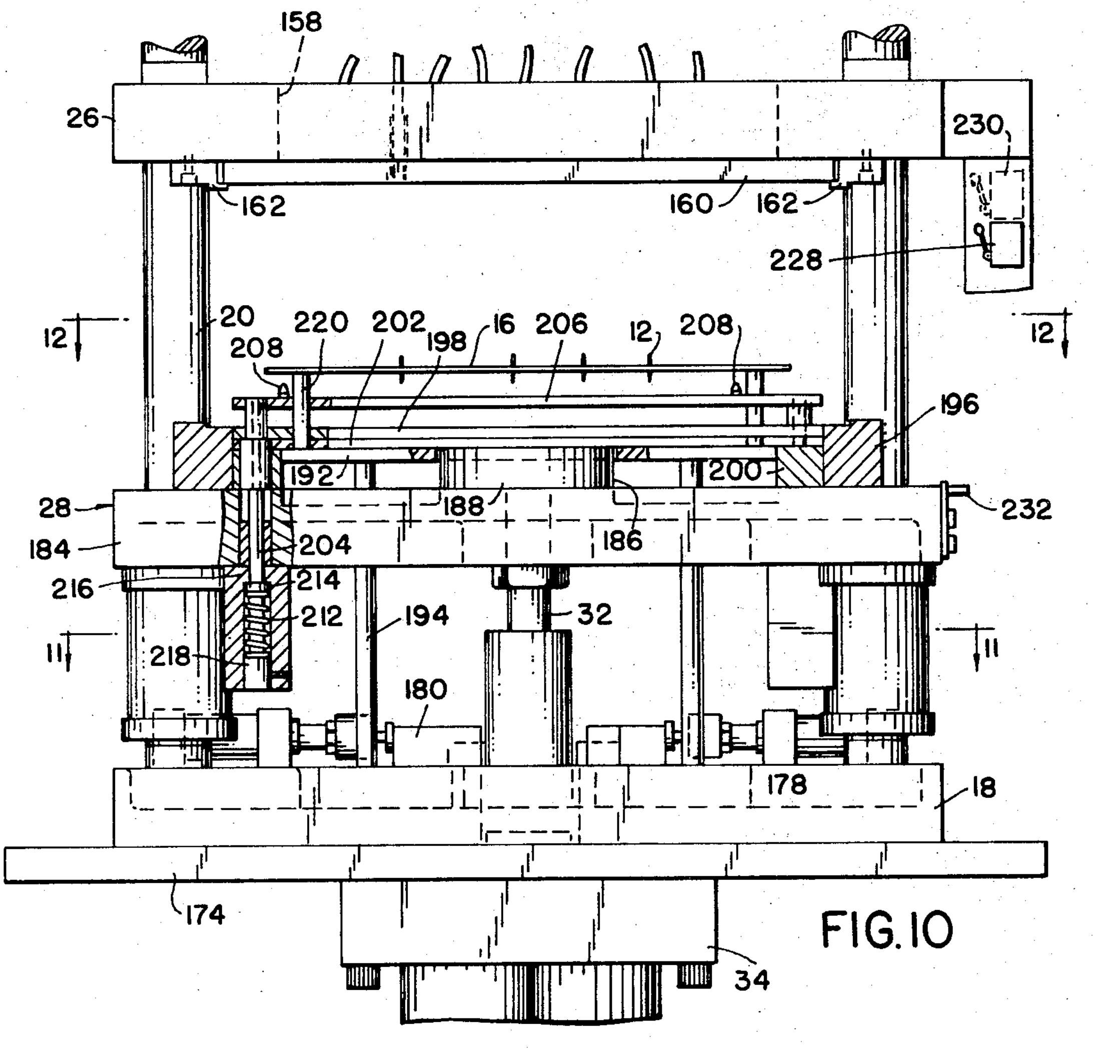
FIG. 10 is an enlarged side view, partially broken away, of the lower portion of the apparatus shown in FIG. 1.
Figure 11:
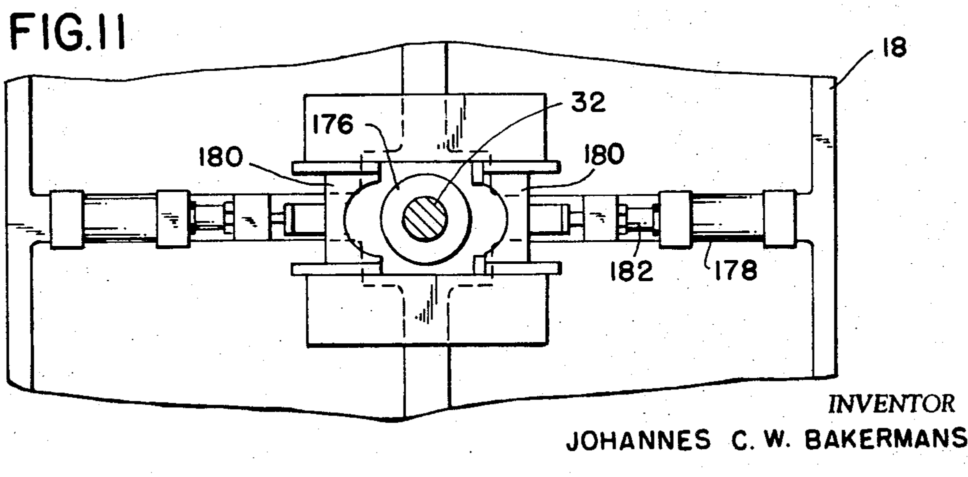
Figures 13, 14, 17, 18:
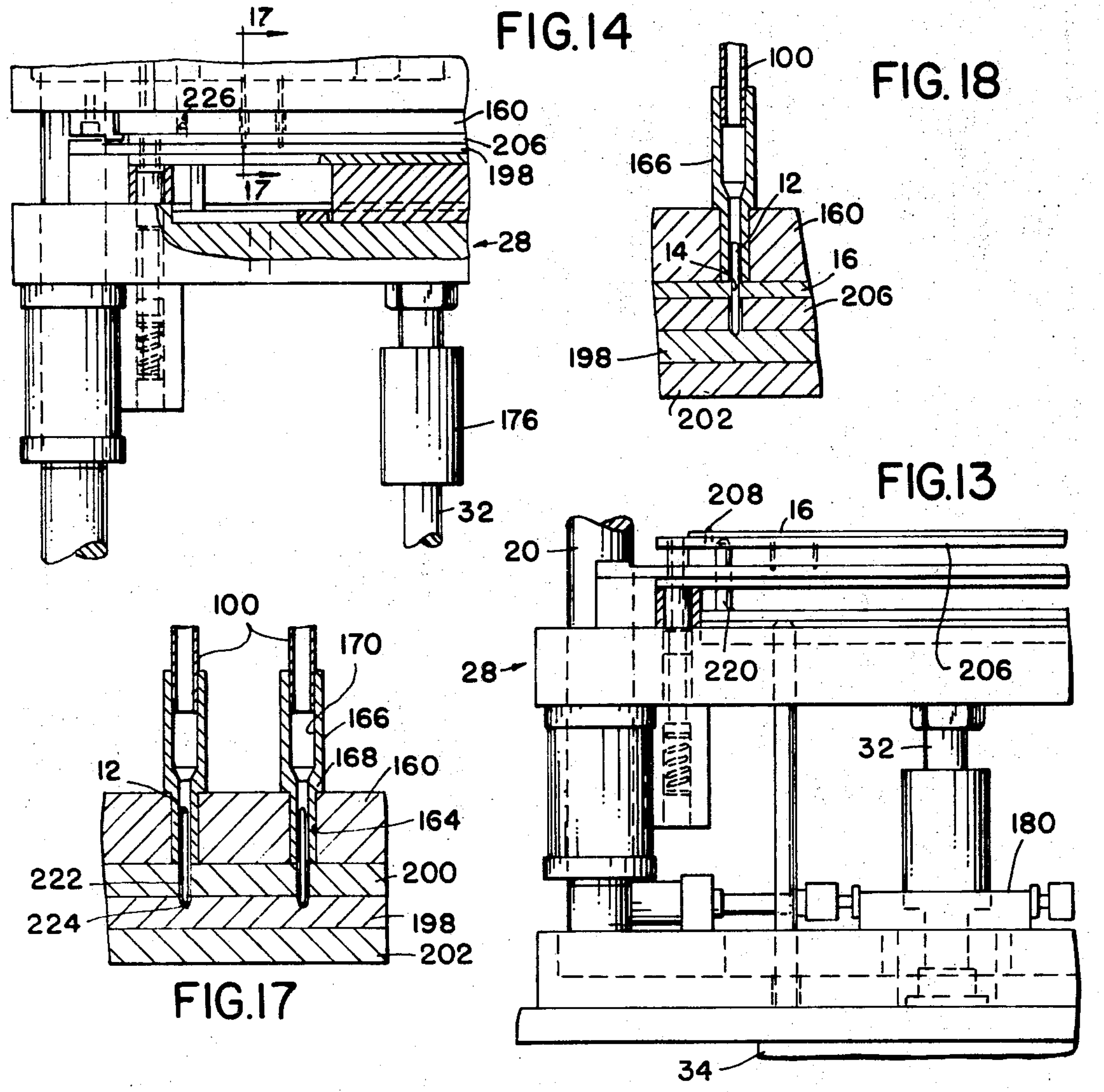
Figure 15:
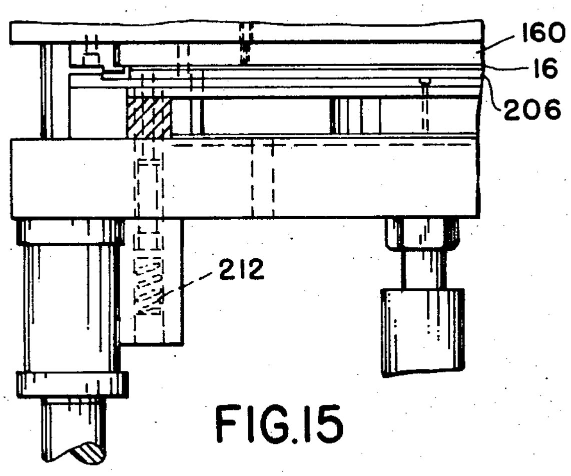
Figure 16:
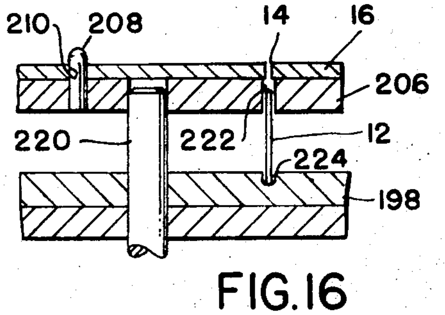
Figures 20, 21:
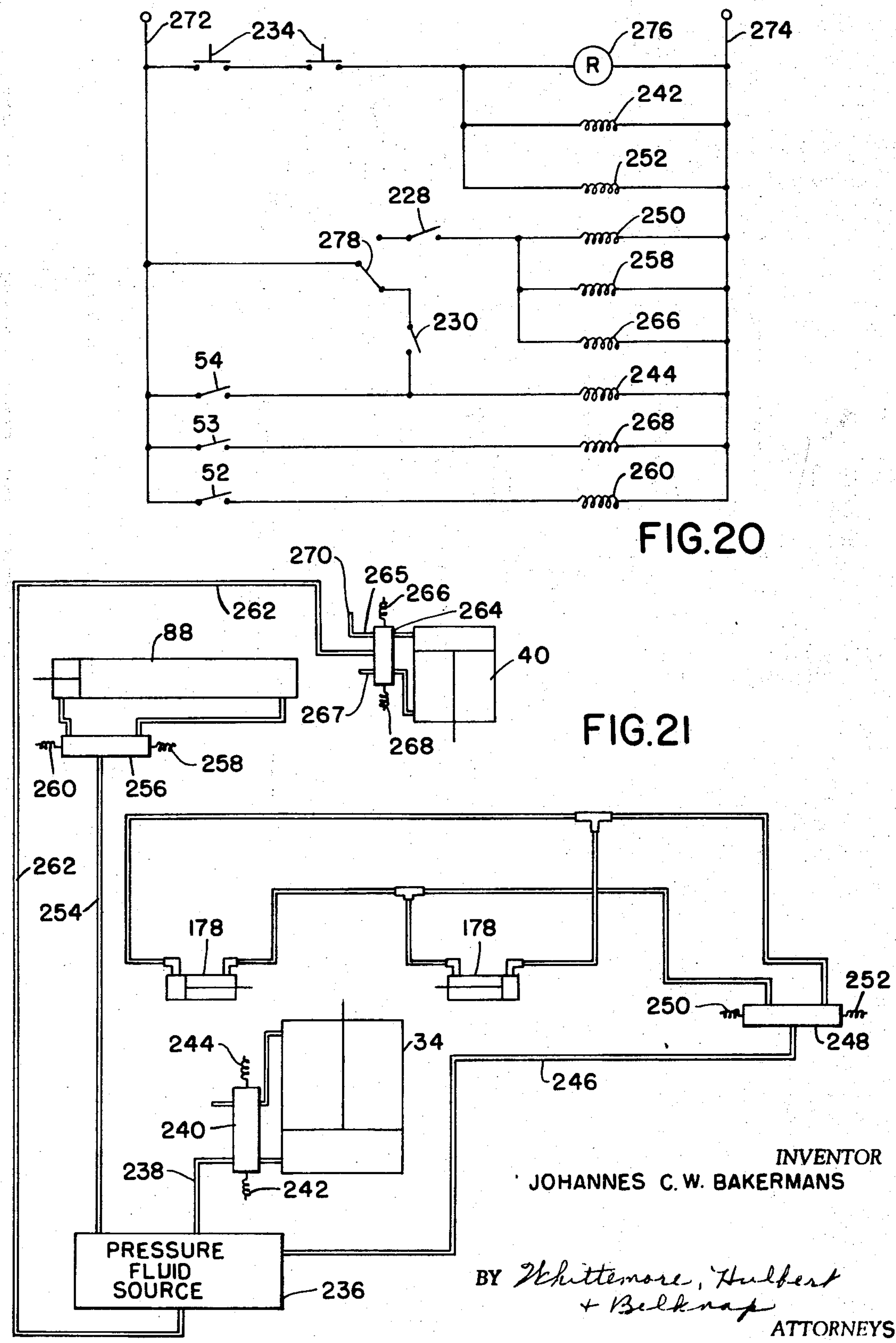

FIGS. 11 and 12 are sectional views taken along lines 11—11 and 12—12 respectively of FIG. 10;

FIGS. 13, 14 and 15 are views of portions of the apparatus shown in FIG. 10, illustrating the operation of the apparatus;

FIGS. 16 and 17 are enlarged views of portions of FIGS. 13 and 14 respectively;

FIG. 18 is a view similar to FIG. 17, illustrating staking of the wire wrap pins to a circuit board;

FIG. 19 is a perspective view of a circuit board on which wire wrap pins are mounted by the apparatus;

FIG. 20 illustrates the electric circuitry of pin applicator 10; and

FIG. 21 illustrates the pneumatic circuitry of the apparatus.

Figure 1:
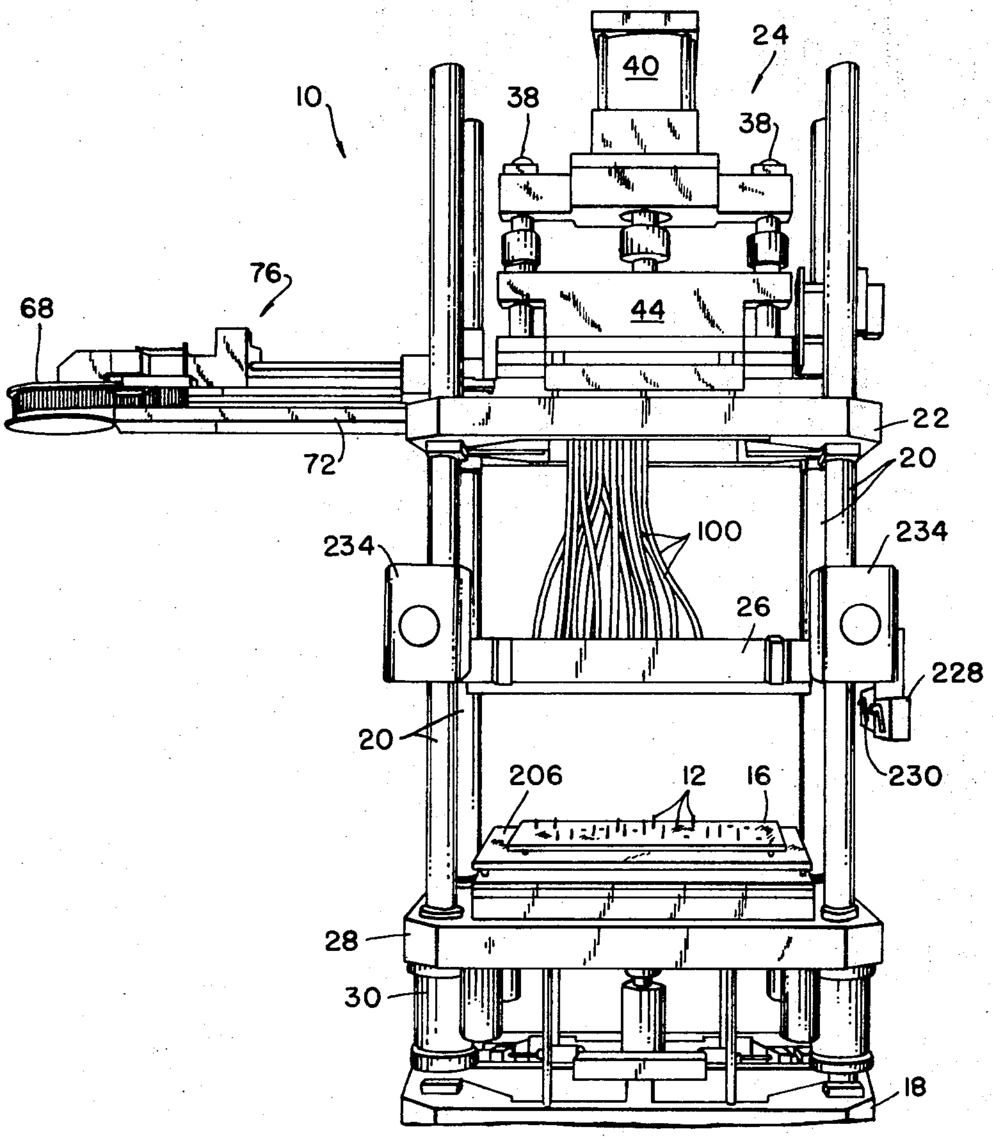
FIG. 1 is a side view of an apparatus for mounting wire wrap pins on a circuit board.

FIG. 1 illustrates a terminal or wire wrap pin applicator 10 useful to mount a number of wire wrap pins 12 in preformed holes 14 in a circuit board 16. As indicated in FIG. 19, the holes 14 are arranged in a predetermined pattern on board 16. The applicator 10 is mounted on a suitable support and includes a square lower base 18 which supports four vertically extending posts 20. A fixed upper plate 22 is mounted on posts 20 and supports a terminal or pin cut-off unit 24. A second fixed plate 26 is mounted on posts 20 below plate 22.

A center plate 28 is slidably mounted on posts 20 by means of sleeve bearings 30 so as to be movable from the lower position illustrated in FIG. 1 toward and away from fixed plate 26. A piston rod 32 of air cylinder 34 is secured to the bottom of plate 28 so that movement of the plate is controlled by extension or retraction of the air cylinder.

The pin or terminal cut-off unit 24 is illustrated in FIGS. 2 through 7 and includes a base 36 mounted on plate 22. As illustrated in FIG. 1, the center of plate 22 is cut out so that the center of base 36 is above plate 26. The base supports a pair of vertically extending rods 38 on which cut-off air cylinder 40 is mounted. The piston rod 42 of cylinder 40 is connected to a ram 44 which is slidably mounted on rods 38 by sleeve bearings 46. A stepped cutter 48 (see FIG. 2) is mounted on the ram so that upon extension of air cylinder 40 and lowering of the ram, the cutter severs a predetermined number of terminals or pins from a carrier strip.

The ram carries a cam 50 which extends away from the cut-off unit so that upon raising and lowering of the ram the triggers of microswitches 52, 53 and 54 are contacted to actuate the switches. The microswitches are mounted on base 36 by means of suitable support plates 56.

Figure 9:
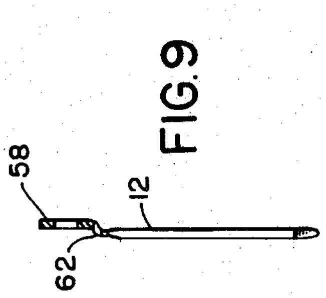
FIG. 9 is a sectional view of the strip taken along line 9—9 of FIG. 8.
Figure 8:
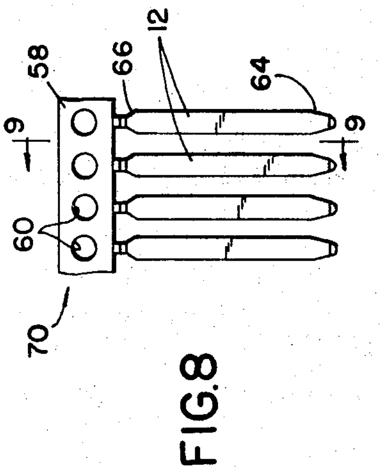
FIG. 8 is a view of a portion of a strip of wire wrap pins which is fed to the cut-off apparatus.

Pins 12 are supplied to cut-off unit 14 in strip form as illustrated in FIGS. 8 and 9. The pins are arranged in spaced relation on a carrier strip 58 and extend laterally to one side thereof. The strip is provided with pilot holes 60 at regular intervals to facilitate feeding of the strip to the cut-off unit. As illustrated in FIG. 9, the pins 12 are offset to one side of strip 58. Each pin is connected to the strip by a reduced connecting portion 62 which offsets the pin. The lower ends 64 of the pins are tapered to facilitate movement of the pins from the cut-off unit to the center plate 28. The upper ends 66 of the pins are provided with bevels to facilitate staking of the pins to the circuit board. The pins are generally rectangular in cross section.

Figures 2, 6:
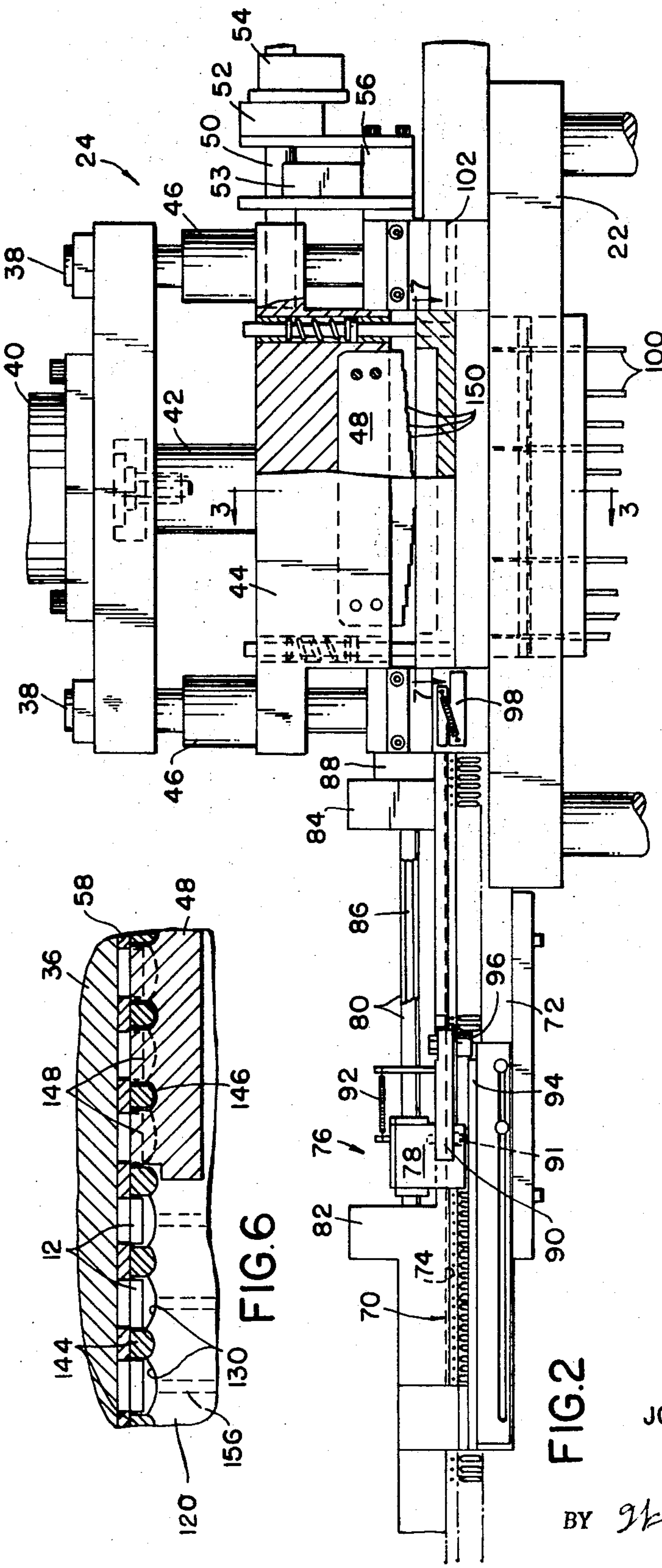
FIG. 2 is a front view, partially broken away, of a pin cut-off unit which is located at the top of the apparatus shown in FIG. 1.
FIG. 6 is a sectional view taken at line 6—6 of FIG. 4 during severing of pins from a carrier strip.

Pins 12 are supplied to cut-off unit 24 from a reel 68 on which the terminal or pin strip 70 illustrated in FIGS. 8 and 9 is wound. The reel is pivotally mounted on support 72 which is part of plate 22. The strip 70 is fed toward cut-off unit 24 along support 72 as indicated in FIG. 2 with carrier strip 58 confined in groove 74. The terminals or pins 12 extend down below the groove.

An adjustable strip feed 76 moves a predetermined number of pins 12 to the cut-off unit. Feed 76 includes a slide 78 which is mounted on a pair of slide bars 80 so as to be movable between blocks 82 and 84 on support 72. The slide 78 is secured to piston rod 86 of air cylinder 88, which is partially illustrated in FIG. 2, so that the position of the slide 78 on bars 80 is controlled by extending or retracting the air cylinder.

Feed finger 90 is pivotally mounted on slide 78 at 91 and extends toward the cut-off unit 24. Spring 92 biases the finger 90 against support 72 so that the feed finger is held against the carrier strip 58 and the lead end of the feed finger is fitted within a pilot hole 60 of the carrier strip. Adjustable cam 94 is mounted on support 72 below groove 74. Roller 96 on feed finger 90 engages cam 94 during extension of air cylinder 88 to hold the feed finger 90 away from the carrier strip. Cam 94 is adjusted to determine the number of pins 12 which are fed to the cut-off unit during each cycle of operation. A spring-biased back up latch 98 engages strip 58 to prevent retraction of strip 70 during the return stroke of feed 76.

Cut-off unit 24 severs a number of pins 12 from strip 58. The severed pins fall through drop tubes 100 to fixed plate 26. The drop tubes 100 are preferably formed from a flexible plastic material so that the lower ends may be arranged in a pattern on plate 26 conforming to the pattern of the pin-receiving holes 14 in circuit board 16.

Figures 3, 4, 5:
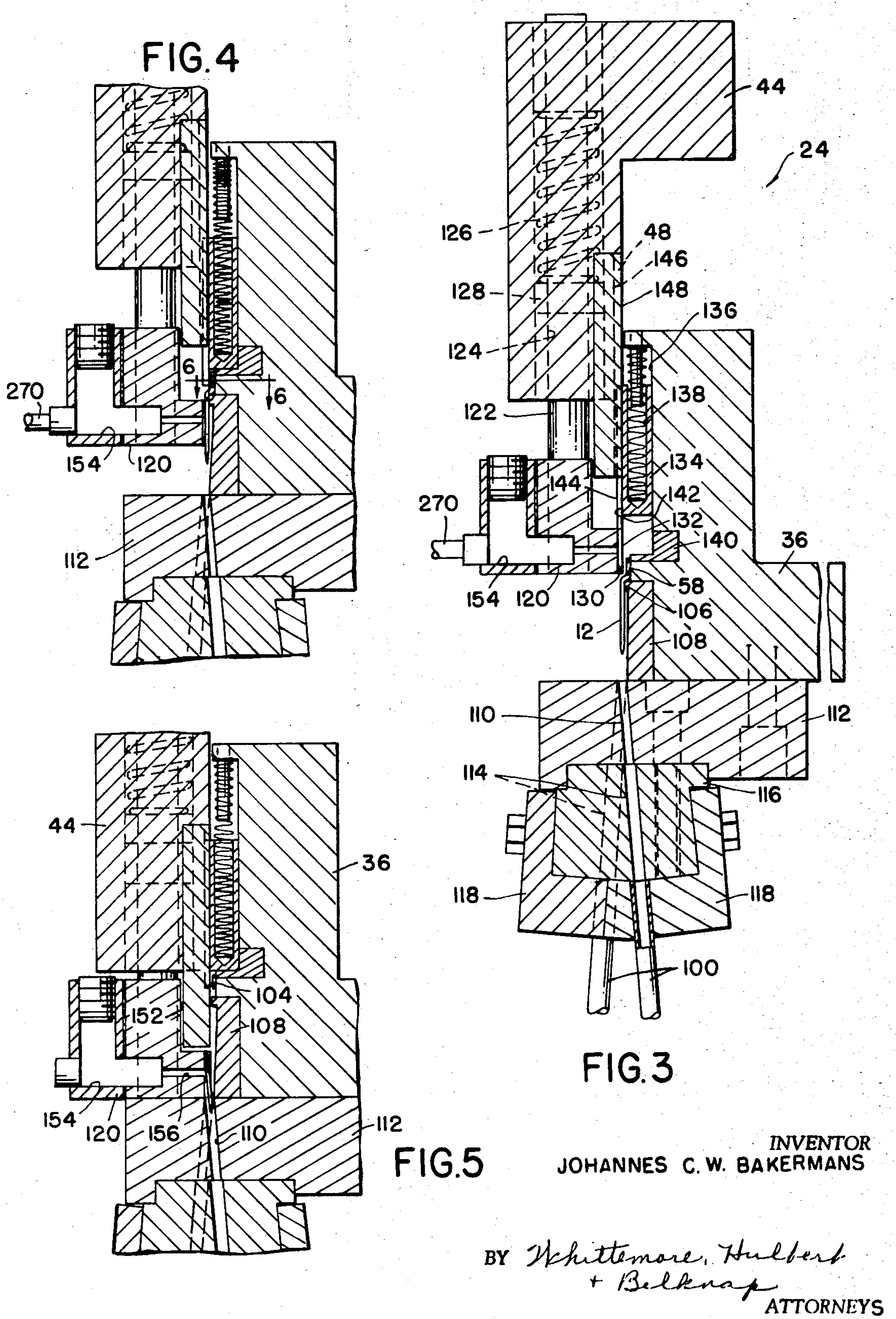
FIG. 3 is an enlarged sectional view taken along line 3—3 of FIG. 2.
FIGS. 4 and 5 are similar to FIG. 3 and illustrate the operation of the cut-off unit.
Figure 7:
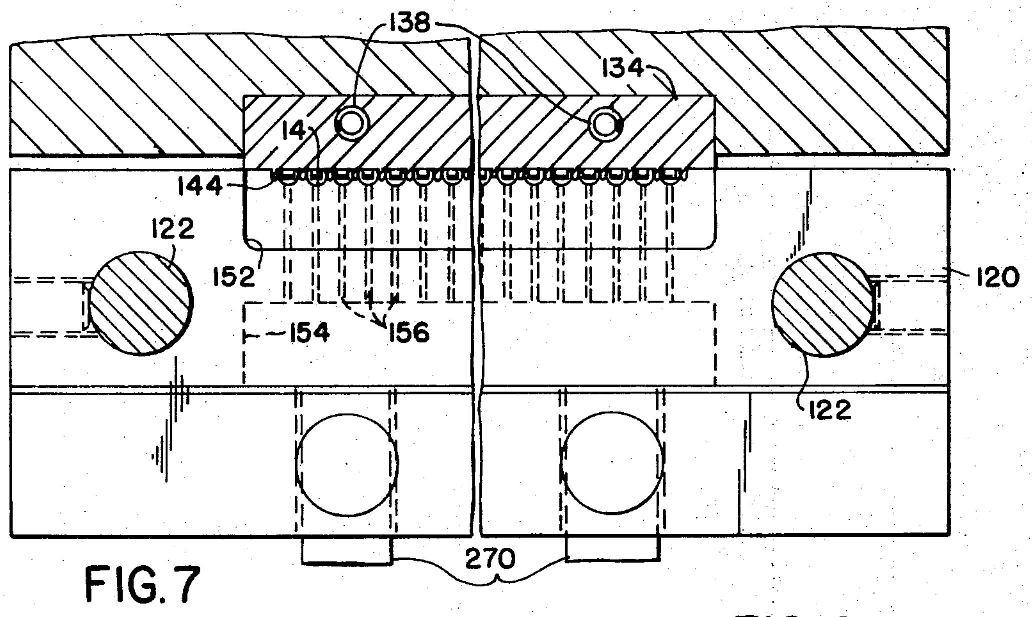
FIG. 7 is a sectional view taken along section line 7—7 of FIG. 2.

FIG. 3 is a transverse sectional view of the cut-off unit 24 showing the unit in position to receive pins fed by feed 76. The continuous carrier strip 58 extends from groove 74 through the cut-off unit and a groove 102 to a suitable disposal. The strip 58 runs along face 104 of base 36 with pins 12 hanging down over lip 106 of insert 108. When the terminal strip 70 is fully fed to cut-off unit 24, each pin 12 is located immediately above a pin-receiving bore 110 in block 112. The block is mounted on the lower face of base 36.

Each bore 110 communicates with a slightly larger bore 114 in tube holder 116. Each drop tube 100 is clamped to the bottom of tube holder 116 by a clamp 118 to receive pins from bores 114. As indicated in FIG. 3, the diameter of bores 114 is slightly greater than the diameter of bores 110 to prevent possible hang-up of the pins as they drop from the cut-off unit to plate 26. The interior diameter of tubes 100 is such as to prevent hang-up of pins between bores 114 and the tubes.

Because of the close spacing between adjacent pins 12 on strip 70, adjacent bores 110 extend away from the upper face of block 112 at a slight angle. Thus the upper ends of the bores 110 are in alignment to receive each pin 12 of strip 70 and the lower ends of bores 114 are spaced sufficiently to permit grouping of the tubes 100 together to receive the severed pins. The diameter of the drop tubes 100 is greater than the spacing of pins 12 on strip 70 so that it is impossible to arrange the tubes 100 in a straight line in order to receive the pins. The severed pins are guided into the bores 110 and fall down drop tubes 100 to their location on plate 26.

Comb 120 is mounted on vertical pins 122 which extend upwardly into bores 124 in ram 44. Springs 126 are confined in recesses in bores 124 and react on collars 128 on pins 122 to bias the comb toward the down position of FIG. 3 where the collars abut an interior shoulder in the bore. The face of the comb adjacent strip 58 is provided with a groove 130 adjacent each pin 12 as indicated in FIG. 6. The ridges 132 between adjacent grooves 130 extend toward the carrier strip 58 and have a sliding clearance with lip 106 upon lowering of ram 44. Lowering of the ram to the position illustrated in FIG. 4 moves the comb down so that each pin 12 is confined in a groove 130. The comb extends the width of the cut-off unit so that lowering of the ram straightens and aligns all of the pins which will be severed from strip 58 during actuation of the cut-off. Straightening and aligning of the pins occur prior to severing of them from the strip.

Slide plate 134 is confined in a recess 136 in base 36 above strip 58 and extends across the width of the cut-off unit. Springs 18 bias plate 134 toward the bottom position where the plate engages the upper surface of insert 140. Grooves 142 and ridges 144 are provided on the face of plate 134 away from base 36. Ridge 144 are spaced along the plate at the same intervals as ridges 132 on comb 120 so that when the ram 44 is in the up position of FIG. 3 and the comb is held above pins 12, ridges 144 abut ridges 132 so that the plate 134 is held above insert 140 and springs 138 are compressed. Ridges 144 extend downwardly past the lower face of plate 134 so that when the plate is in the position illustrated in FIG. 4, the ridges extend past strip 58 to confine the strip and prevent buckling or twisting of the strip. When the ram is up as in FIG. 3, comb ridges 132 hold strip 58 in place.

Cutter 48 is provided with a number of grooves 146 and ridges 148. Grooves 146 are spaced to have a sliding fit with ridges 144 of plate 134. Ridges 148 have a sharp cutting edge so that as the ram lowers, the ridges cooperate with lip 106 to shear pins 12 from carrier strip 58. Grooves 142 and ridges 144 have a sliding fit with grooves 146 and ridges 148. The lower surface of cutter 48 is provided with a number of steps 150 as shown in FIG. 2 so that upon lowering of the ram all the pins 12 are not severed from strip 58 at once.

As the ram lowers from the position of FIG. 4, comb 120 bottoms on the upper surface of block 112. Further movement of the ram lowers the cutter 48 to sever terminals from the strip 58 progressively. When the ram is fully bottomed as illustrated in FIG. 5, the cutter extends into recess 152 in the comb and all of the pins are severed from the carrier strip. The comb holds the pins in alignment during severing from the strip to assure that each pin falls into its appropriate bore 110. The steps 150 of cutter 48 are arranged symmetrically about the central lowermost step of the cutter so that as the ram is lowered the terminals or pins beneath the lowermost step are first severed from the carrier strip, following which pairs of steps to either side of the lowermost step sever pins from the strip. In this way the strip is acted on symmetrically to prevent generation of torsion in the strip and the severed pins are not imparted with unusual energies during severing. Such energies could prevent the pins from falling properly through their drop tubes. Additionally, the stepped cutter construction does not sever all of the pins from the strip at one time so that the operation of the cut-off unit is smooth and an overly large air cylinder 40 is not required.

A pressure manifold 154 is provided in comb 120 and communicates with the space between the comb and insert 108 by a number of bores 156. A blast of air is provided to the manifold after cutting of the pins to clean the drop tubes and facilitate movement of the pins to plate 26. Following severing of the pins from the carrier strip, the ram rises back to the position of FIG. 3 to permit additional pins to be indexed to the cut-off unit 24.

Lowering and raising of ram 44 moves cam 50 past the triggers of switches 52, 53 and 54 to actuate the same. As the cam is lowered it engages the one-way trigger of normally open microswitch 54 without closing the switch. When the ram is fully bottomed and the pins are severed from the carrier strip, cam 50 engages the trigger of normally open microswitch 53 to close the same. During the up stroke of the ram, cam 50 engages the one-way trigger of microswitch 54 to close the same momentarily. When the ram returns to the up position illustrated in FIG. 3, it engages the one-way trigger of normally open microswitch 52 to close the same momentarily. Downward movement of cam 50 engages the trigger of switch 52 without closing the switch.

The interior of plate 26 is cut away as illustrated in FIG. 10 to provide interior opening 158. Tube locating plate 160 is secured to the bottom surface of plate 26 by clamps 162 and is provided with a number of bores 164 which are arranged in the same pattern as the terminal-receiving holes 14 of circuit board 16. The lower end of each drop tube 100 is fitted in the interior bore of an insert 166. Each insert has a reduced diameter lower section adapted to fit within a bore 164. The inserts are held in position on plate 160 by shoulders 168 so that the lower ends of the inserts are flush with the bottom surface of plate 160. The lower portion of the insert bore 170 has a slightly greater diameter than the maximum transverse diameter of pins 12 so that the pins fall freely down tube 100 and into and through bore 170. The diameter of bore 170 is tapered down to the reduced section to prevent hang-up of the pins in the insert. The inserts 166 are easily removed from plate 160 so that the apparatus may be adapted to mount pins on circuit boards having different patterns of pin-receiving holes formed therein.

Posts 20 are mounted in base 18 on support 174. Cylinder 34 is mounted on the bottom of support 174 and piston rod 32 extends through an opening in the support to movable plate 28. The piston rod is provided with an enlarged collar 176. A pair of air cylinders 178 are mounted on base 18 to either side of rod 32. Clamps 180 are attached to the outer ends of the piston rods 182 of air cylinders 178 so that extension of the air cylinders moves the clamps toward the piston rods. FIG. 10 illustrates plate 28 in the full down position with air cylinders 34 and 178 retracted. The lower end of collar 176 is positioned below clamps 180. When the cylinder 34 is extended to move plate 28 above the position of FIG. 10, collar 176 is moved above clamps 180 to permit extension of air cylinders 178 to position clamps 180 around rod 32. With the cylinders 178 extended, lowering of air cylinder 34 bottoms collar 176 on clamps 180 as illustrated in FIG. 13 to prevent movement of plate 28 down past the position illustrated in that figure.

Middle plate 28 includes a frame member 184 which is provided with a cut-out interior recess 186. Hub 188 is connected to frame 184 by ribs 190 to facilitate mounting of the plate 28 on piston rod 32. A flat lift plate 192 is confined within recess 186 between the hub and the inner walls of frame 184. Four lift pins 194 are mounted on base 18 and extend upwardly therefrom into recess 186 so that when clamps 180 are withdrawn from around rod 32 and plate 28 is in its lowest position, the pins 194 raise plate 192 in recess 186 as illustrated in FIG. 10.

Mounting blocks 196 are located on top of frame 184 on opposite sides thereof and hold pin-receiving plate 198 in fixed relation to frame 184. Support 200 extends around the periphery of recess 186 above frame 184 and supports a fixed plate 202. Plate 198 abuts plate 202. Four spring-backed lift pins 204 extend through bores in frame 184 and support 200 and through openings in plates 198 and 202. A pin support plate 206 is mounted on the upper ends of lift pins 204. Plate 206 is provided with mounting pins 208 which cooperate with mounting holes 210 in circuit board 16 so that the circuit board may be mounted flush on plate 206 when the central plate 28 is in the position of FIG. 13. Pins 204 are held in the normally extended position illustrated in FIG. 10 by springs 212 which hold the collars 214 against shoulders 216. When plate 206 is collapsed against plate 198, pins 204 are retracted to compress springs 212 between collars 214 and shoulders 218. Pins 204 may be of two-part construction as illustrated in FIG. 10 where the pins include portions above and below the upper surface of frame 184. Hub 188 extends upwardly above the surface of frame 184 to the level of supports 200 so that plate 202 may be secured directly to the hub. When the center plate 28 is fully retracted, pins 194 lift plate 192 up adjacent plate 202.

Four dowel pins 220 are fitted in bores in plates 202, 198 and 206 so that they rest upon plate 192. These pins lift the circuit board 16 above plate 206 when the center plate 28 is fully retracted. When the center plate is above the fully retracted position of FIG. 10, plate 192 rests on ribs 190 and pins 220 are withdrawn to permit the circuit board to rest flush upon plate 206.

The center plate 28 is raised from a lower position against the fixed upper plate 26 twice during each cycle of operation of the apparatus. The position of center plate 28 against plate 26 when it is first raised is illustrated in FIG. 14, a portion of which is shown enlarged in FIG. 17. Plate 28 is raised above pins 194 so that dowel pins 220 do not project above plate 206. Extension of air cylinder 34 moves plate 206 flush against the lower surface of plate 160 so that continued extension of the air cylinder collapses springs 212 to bring plate 198 into contact with plate 206 as illustrated.

Plate 206 is provided with a number of pin-holding bores 222 which are arranged in the same pattern as the pin-receiving holes 14 of circuit board 16 with a bore located immediately beneath the interior bore 170 of each insert 166. A plurality of pin-receiving recesses 224 are provided in the upper surface of plate 198 in the same pattern as bores 122 with a recess located immediately beneath each bore 222. As illustrated in FIG. 17, bores 222 and recesses 224 receive pins 12 which fall through drop tubes 100 to plate 26.

As the air cylinder 34 retracts to lower plate 28 from plate 26, springs 212 hold plate 206 above plate 198 so that the pins 12 are confined in an upright position between the plates by bores 222 and recesses 224, as shown in FIG. 16. The upper surface of plate 206 is above the upper ends of pins 12 to permit mounting of a circuit board 16 flush upon the plate. When the circuit board 16 is mounted on plate 206 with locating pins 208 extending through holes 210, each pin-receiving hole 14 in the board is located immediately above a pin held by plates 206 and 198. Recesses 226 are provided in plate 160 to accommodate pins 208 when plate 206 is raised against the plate 160.

Following mounting of circuit board 16 on plate 206, plate 28 is again moved up to engage plate 26. When circuit board 16 engages the lower surface of plate 160, springs 212 are again collapsed so that when air cylinder 34 is extended the circuit board is sandwiched between plates 160 and 206 and plates 206 and 198 abut each other. Movement of plate 198 toward plate 206 moves pins 12 up through pin-receiving holes 14 in circuit board 16 so as to secure the pins to the circuit board. As indicated in FIG. 18, the portions of the pins which project above the circuit board 16 extend into the central bores of inserts 166. Holes 14 have a somewhat smaller cross section than that of pin 12 so that the pins are driven into the holes with a tight press fit.

A pair of normallyopen microswitches 228 and 230 are mounted on a bracket to one side of plate 26. Switch 228 is provided with a one-way trigger which engages cam 232 on frame 184 to turn the switch 228 on momentarily just before the end of the upward movement of plate 28. Normally open switch 230 is closed by frame 184 when the plate has moved all the way up. During descent of plate 28 the one-way trigger of switch 228 is tripped without closing the switch. As illustrated in FIG. 1, a pair of normally open palm switches 234 are mounted on plate 26.

FIG. 21 illustrates the pneumatic circuitry of the apparatus. Air cylinder 34 is connected to pressure fluid source 236 by lead 238 and control valve 240. The position of valve 240 is determined by solenoids 242 and 244 so that upon actuation of solenoid 242 the valve is shifted to extend the air cylinder, and upon actuation of solenoid 244 the valve is shifted to retract the air cylinder 34.

Likewise clamp air cylinders 178 are connected to pressure fluid source 236 by lead 246 and control valve 248 having solenoids 250 and 252. Actuation of solenoid 250 shifts valve 248 to extend cylinders 178, and actuation of solenoid 252 shifts the valve to retract cylinders 178. Feed air cylinder 88 is connected to the pressure fluid source through lead 254 and control valve 256. The position of valve 256 is determined by solenoids 258 and 260 so that upon actuation of solenoid 258 the air cylinder 88 is extended, and upon actuation of solenoid 260 the air cylinder is retracted.

Cut-off air cylinder 40 is connected to the pressure fluid source 236 through lead 262 and control valve 264 having solenoids 266 and 268. Actuation of solenoid 266 extends cylinder 40 to sever pins from the carrier strip, and actuation of solenoid 268 shifts valve 264 to retract cylinder 40. Valve 264 is provided with two vents ports 265 and 267. Vent port 267 vents the air expelled from cylinder 40 during extension thereof to atmosphere. Vent port 265 vents the space above the piston in cylinder 40 to pressure line 270. As illustrated in FIG. 4, line 270 is connected to manifold 154 so that the air expelled from cylinder 40 during retraction is communicated to the manifold and flows through bores 156 to each groove 130 in the comb. The air vented from cylinder 40 to the comb aids in dislodging any pins caught in the cut-off and drop tubes and also clears oil or other foreign matter from the comb, passages 110 and 114, and tubes 100.

The electric circuitry of pin applicator 10 is illustrated in FIG. 20. Leads 272 and 274 are connected to a power source and a number of circuits are connected between the leads 272 and 274. Palm switches 234 are connected in series with ratchet relay 276, solenoid 242, and solenoid 252. The ratchet relay 276 is provided with a set of contacts 278 having alternate positions. When contacts 278 are in a first position, power is supplied to solenoids 250, 258, and 266 upon closing of switch 228. When the contacts are in a second position, power is supplied to solenoid 244 upon closing of switch 230. Switch 54 is in parallel with contacts 278 and switch 230 to provide power to solenoid 244 when it is closed. Switch 53 is in series with solenoid 268 and switch 52 is in series with solenoid 260.

OPERATION OF THE APPLICATOR

At the end of a cycle of operation applicator 10 is positioned as illustrated in FIG. 1. Pins 12 have been mounted on circuit board 16 and the board is supported above plate 206 on pins 220. The operator then removes the board 16 from center plate 28.

The next cycle of operation is begun when the operator closes both palm switches 234. Closing of these switches sends a power pulse through ratchet relay 276 so as to shift contact 278 to the first position whereby switch 228 is connected to lead 272. A power pulse is also provided to solenoids 242 and 252.

Actuation of solenoid 252 shifts valve 240 to extend cylinder 34, thereby moving middle plate 28 up toward plate 26. Actuation of solenoid 252 shifts valve 248 to retract clamp air cylinders 178 so that clamps 180 are moved to the position of FIG. 11 out of the way of collar 176.

As plate 28 nears plate 26, cam 232 trips the trigger of switch 228 to momentarily close the same and provide a power pulse through solenoids provide a power pulse through solenoids 250, 258 and 266. Actuation of solenoid 250 shifts valve 248 to extend clamp air cylinders 178 and move clamps 180 into position to engage collar 176 when cylinder 34 is retracted to lower plate 28. Actuation of solenoid 258 shifts valve 256 to extend air cylinder 88 and move feed assembly 76 upstream relative to the carrier strip 70. When the feed finger is moved past the number of pins 12 to be fed into the cut-off assembly 24, roller 96 engages cam 94 and lifts the feed finger away from carrier strip 58. Air cylinder 88 extends fully to move slide 78 adjacent block 82. Actuation of solenoid 266 shifts valve 264 to extend air cylinder 40 and lower cut-off ram 44.

The extension of air cylinder 34 moves plate 28 up against plate 26 and collapses springs 212 to sandwich plate 206 between plates 160 and 198 as illustrated in FIG. 14. Because switch 228 is tripped only slightly before air cylinder 34 is fully extended, actuation of solenoid 266 does not lower ram 44 rapidly enough to sever pins from the carrier strip prior to seating of plate 28 on plate 26 as illustated in FIG. 14. When plate 28 has moved up to the position illustrated in FIGS. 14 and 17, each hole 222 and its corresponding recess 224 are located beneath the interior bore 170 of the corresponding insert 166 in plate 160.

As ram 44 in cut-off unit 24 descends, the comb 120 moves down to straighten and align the pins 12 which are in the cut-off unit as illustrated in FIG. 4. Further downward movement of the ram bottoms the comb on plate 112 just before the lowest step of cutter 48 severs the pins 12 located in the center of the cut-off unit. The comb bottoms on plate 112 prior to cutting to assure that all of the pins 12 are reliably guided to their respective bores 110 in plate 112. Thus prior to severing of pins from carrier strip 58, the passage defined by each groove 130 and insert 108 is an extension of a bore 110. When the comb is bottomed on block 112 as illustrated in FIG. 5, pins on strip 58 are confined in grooves 130. Upon severing from the carrier strip, the pins fall directly into bores 110 as illustrated. The cutter aids in propelling the pins into the bores. Continued lowering of the ram moves cutter 48 down past strip 58 so that the progressive steps 150 sever the pins from the strip.

The interior diameter of drop tubes 100 is sufficiently greater than the maximum transverse cross section of the pins 12 so that the pins will fall from the cut-off unit to plate 26 despite the bending of the tubes required to position inserts 166 in the desired pattern on plate 160. As indicated in FIG. 17, the pins fall down tubes 100, through inserts 166, and into bores 222 and recesses 224. The upper portions of the pins extend into inserts 166. Thus the pins fall from the cut-off unit through the tubes to locations in plates 198 and 206 conforming to the pattern of pin-receiving holes 14 of circuit board 16. The taper 64 at the lower end of each pin 12 helps prevent the pins from hanging up prior to reaching the position of FIG. 17.

As many as seventy-two pins 12 can be severed from a carrier strip in a single operation of cut-off unit 24 so that the apparatus disclosed is capable of simultaneously mounting seventy-two pins on a circuit board. If additional pins are required on a circuit board, it may be necessary to mount a second cut-off unit on plate 22 in order to sever additional pins. Such a cut-off unit would operate simultaneously with cut-off unit 24.

At the time the air cylinder 34 is fully extended, plate 28 engages the trigger of switch 230 to turn the switch on. Since contacts 278 are shifted to the first posiion, closing of swich 230 does not energize solenoids 244.

Lowering of cam 50 on ram 44 trips the one-way triggers of switches 52 and 54 but does not close either of the switches. When the ram is fully bottomed and all pins 12 have been severed from strip 54, the cam 50 trips the trigger of switch 53 to send a pulse through solenoid 268 to reverse valve 264 and retract air cylinder 40, thereby raising the ram. As the ram is raised, the air expelled from cylinder 40 is vented through lead 270, manifold 154, and bores 156 to each groove 130 in the comb. This provides a blast of air in the grooves which flows both upwardly to remove oil and foreign matter from the cutting area and downwardly through bores 110, 114, tubes 100, and inserts 166. The downward flow of air removes oil and foreign matter from the drop path of the pins while assuring that any pins which have not fallen to plate 28 are cleared from the drop path. The greatest blast of air through bores 156 occurs when cylinder 40 is nearly retracted. At this time plate 28 has lowered sufficiently to vent the pin drop path so that foreign matter and oil are ejected.

As cylinder 40 retracts, the ram is moved up so that cam 50 trips the trigger of switch 54 to close the same and send a power pulse through solenoid 244. Actuation of solenoid 244 shifts valve 240 to retract cylinder 34 and lower plate 28. When air cylinder 40 is fully retracted and the ram is in the up position, cam 50 trips the one-way trigger of switch 52 to close the same momentarily and send a power pulse through solenoid 260. Actuation of solenoid 260 shifts air cylinder 256 to retract air cylinder 88, thereby moving slide 78 back toward cut-off assembly 24. As the slide is retracted, roller 96 rides along cam 94 and the feed finger is held from engagement with terminal strip 70. When the roller falls down from the cam the lead end of the feed finger engages a pilot hole 60 so that strip 70 is moved with the slide during continued retraction of cylinder 88 to index the required number of pins into the cut-off unit.

Cam 50 closes switch 54 to lower plate 28 on the up stroke of the cutter after the severed pins have fallen down drop tubes 100 and through inserts 166 to bores 222 and recesses 224. As cylinder 34 is retracted and plate 28 lowers, springs 212 hold plate 206 against fixed plate 160 until collars 214 engage shoulders 216. During this separation of plates 198 and 206 the severed pins 12 are confined in the plates and in the interior bores of the inserts so that when plates 206 and 198 are fully separated, each pin is held in a bore 222 and recess 224 as illustrated in FIG. 16. Because the pairs of bores and recesses are located in the same pattern as holes 14 in circuit board 16, the pins 12 carried by plate 28 are also arranged in this pattern. Separation of plates 198 and 206 before plate 206 is lowered asures that the pins are held upright and are not accidentally dislodged from the pattern due to the movement of the plate 28.

Retraction of cylinder 34 moves collar 176 down into engagement with extended clamps 180 so as to stop downward movement of plate 28. The retraction of the air cylinder 34 is stopped by the clamps when plate 28 is positioned as illustrated in FIG. 13. With the descent of plate 28 the first half of the cycle of apparatus 10 is complete and plate 28 is loaded with pins 12 arranged in the same pattern as the pin-receiving holes 14 in the circuit board and the apparatus 10 is inactive.

The operator now loads a circuit board 16 on plate 206 by positioning locating holes 210 around locating pins 208. With the board so positioned on plate 206, as illustrated in FIG. 16, each pin-receiving hole 14 is located immediately above a pin 12. The holes 14 are somewhat smaller than the cross section of pins 12.

After board 16 is positioned on plate 206 the operator again closes palm switches 234 to initiate the second half of the cycle of the apparatus. Closing of the palm switches sends a second pulse through ratchet relay 276 and solenoids 242 and 252. Actuation of the ratchet relay 276 shifts contacts 278 to the second position so that switch 230 is connected to lead 272. Actuation of solenoid 242 shifts valve 240 to extend cylinder 34 and raise plate 28 for the second time. Actuation of solenoid 252 shifts valve 248 to retract cylinders 178 and move clamps 180 out of the path of collar 176.

Upward movement of plate 28 brings circuit board 16 into contact with the bottom surface of plate 160. Continued upward movement of plate 28 collapses springs 212 so that plate 198 is raised relative to the fixed circuit board and plate 206. At this time the circuit board 16 is clamped between plate 206 and plate 160. As plate 198 is moved up, the pins 12 seated in the recesses 224 are carried up with the plate so that the beveled lead ends 66 thereof are forced through holes 14 in the board 16. The upward movement of plate 28 is completed when plate 198 abuts plate 206, as illustrated in FIG. 18, and all of the pins 12 are inserted in their respective circuit board holes 14. Driving of the pins through the circuit board holes results in a tight wedge fit so that the pins are physically secured to the circuit board. The upper portions of pins 12 extend into the interior bores of inserts 166 when the pins are fully inserted in the board.

Just before plate 28 reaches the top of its stroke cam 232 trips the trigger of one-way microswitch 228 to momentarily close the same. Because contacts 278 are in the second position, closing of switch 228 does not result in a current flow. When the plate 28 is at the up position, the trigger of normally open microswitch 230 is actuated to close the switch and send a pulse from lead 272 through contacts 278 to solenoid 244. Actuation of this solenoid reverses valve 240 to retract cylinder 32 and lower plate 28. Circuit board 16 with pins 12 attached thereto moves down with the plate since the pins extend freely into the insert bores and are not attached to fixed plate 160.

Retraction of air cylinder 34 moves plate 28 down to the position illustrated in FIG. 10 whereby the collar 176 has passed the open clamps 180 and pins 194 have engaged plate 192 to raise dowel pins 220 above plate 206 so that the circuit board is held as illustrated with pins 12 lifted out of the bores 222. This ends the second half of the cycle of operation of applicator 10. The operator may remove the circuit board from plate 28 and close palm switches 234 to initiate the next cycle of operation of the applicator.

While apparatus 10 described herein is particularly useful in applying elongate wire wrap pins to a circuit board, it is not intended that the invention be limited to the apparatus and method for applying such pins to a circuit board. Other types of pins or terminals can be applied to a circuit board by means of the present invention.

In this disclosed apparatus 10 the pins are driven into the circuit board by the upward movement of center plate 28 relative to fixed plate 26. It is obvious that the pins could be driven into the circuit board by lowering plate 26 relative to plate 28. The invention includes relative movement between the two plates and is not limited to movement of the plate holding the pins relative to a fixed plate through which they have moved during loading into the movable plate.

While I have illustrated and described a preferred embodiment of my invention, it is understood that this is capable of modification and I therefore do not wish to be limited to the precise details set forth, but desire to avail myself of such changes and alterations as fall within the purview of the following claims.

What I claim as my invention is:

1. An applicator for mounting a plurality of terminals on a circuit board in a predetermined pattern comprising a base, a post extending upwardly from said base, a terminal receiving plate slidably mounted on said post, a terminal orienting plate fixedly mounted on said post above said receiving plate, a terminal cut-off mounted on said post above said orienting plate, drive means for moving said receiving plate toward and away from said orienting plate, a plurality of transport bores extending through said orienting plate and arranged in said pattern, a plurality of drop tubes extending from said cut-off unit to said orienting plate with the lower end of each drop tube communicating with one of said bores so that upon actuation of said cut-off unit terminals are transported through said tubes to each of said bores, a plurality of terminal receiving recesses in the upper face of said terminal receiving plate, said recesses being arranged in said pattern with each recess in alignment with one of said bores, said recess being adapted to receive terminals from said bores when said receiving plate is seated on said orienting plate by said drive means, means for mounting a circuit board on said terminal receiving plate following loading of terminals in said recesses and movement of said receiving plate away from said orienting plate by said drive means whereby actuation of said drive means to move said terminal receiving plate back toward said orienting plate seats the circuit board on said orienting plate and drives said terminals into the circuit board.

2. Apparatus as in claim 1 wherein said recesses are collapsible and have a normal longitudinal length at least as great as the longitudinal length of said terminals so that following movement of said receiving plate away from said orienting plate the terminals are located below the upper surface of said plate, said mounting means including circuit board locating means for positioning the circuit board on the upper face of said terminal receiving plate, the distance of collapse of said recesses being greater than the thickness of the circuit board so that movement of said receiving plate toward said orienting plate drives portions of said terminals through said circuit board and into said bores.

3. Apparatus for mounting a plurality of terminals on a circuit board in a predetermined pattern comprising a first plate having a plurality of terminal transport bores extending therethrough and arranged in said pattern, a second plate located to one side of said first plate, drive means for effecting relative movement between said plates to bring the plates together and to separate said plates, terminal supply means for positioning terminals in said bores from the side of said first plate away from said second plate so that the terminals move through said bores and are loaded on said second plate in said pattern when said plates are together, mounting means for holding the circuit board between said plates following loading of said terminals on said second plate and separation of said plates by said drive means whereby closing of said plates by said drive means attaches said terminals on said circuit board in said pattern.

4. Apparatus as in claim 3 wherein said second plate includes a plurality of terminal receiving recesses arranged in said pattern on the side thereof facing said first plate, each recess being aligned with one of said transport bores so as to receive a terminal from said bore when said plates are together, said mounting means being adapted to hold a circuit board on said second plate with each terminal receiving location positioned above one of said recesses, said recesses being adapted to hold said terminals in said pattern with portions thereof extending above said second plate when said plates are together whereby closing of said plates seats said terminals on said circuit board with portions of the terminals projecting into the circuit board.

5. Apparatus as in claim 4 wherein said means for supplying terminals comprises a terminal cut-off unit for severing a plurality of terminals from a carrier strip and a plurality of terminal transport tubes, each transport tube extending from said cut-off unit to one of said bores.

6. Apparatus as in claim 3 wherein said second plate includes a base having a plurality of terminal receiving recesses arranged in said pattern on the face adjacent said first plate and a terminal locating plate mounted on said base plate adjacent said first plate by a collapsible spring-backed connection, said connection normally separating said locating plate from said base plate, said locating plate having a plurality of terminal bores through the thickness thereof and arranged in said pattern with each bore located above a recess in said base plate, said mounting means being adapted to hold a circuit on said locating plate, whereby closing of said first and second plates collapses said connection and sandwiches said locating plate between said first and base plates so that terminals from said transport bores are seated in said locating bores and recesses, and upon opening of said first and second plates said connection separates said base and locating plates to hold the terminals in said pattern below the surface of said locating plate to permit mounting of a circuit board flush upon said locating plate.

7. Apparatus as in claim 6 for mounting a plurality of elongate pins on a circuit board wherein the width of said locating plate plus the depth of said recesses is less than the axial length of said pins and the width of said locating plate plus the normal separation between said base and locating plates maintained by said connection and the depth of said recesses is greater than the axial length of said pins whereby closing of said first and second plates following loading of said pins in said second plate and positioning of a circuit board on said mounting means drives portions of said pins into the circuit board.

8. Apparatus for mounting a plurality of terminals on a circuit board in a predetermined pattern including a plate having a plurality of terminal transport bores extending therethrough and arranged in said pattern, a terminal receptacle movable toward and away from said plate and adapted to receive terminals transported through said bores when positioned adjacent said plate, mounting means for holding a circuit board between said plate and said receptacle when separated, said receeptacle being adapted to drive said terminals into said circuit board during movement of the receptacle toward the plate.

9. Apparatus as in claim 8 wherein said receptacle includes a plurality of terminal receeiving recesses adapted to hold the terminals in said pattern following movement of the support away from said plate.

10. Apparatus for attaching a terminal to a circuit board comprising a plate having a transport bore therein, a support movable toward and away from said plate and having terminal holding means thereon adapted to receive a terminal from said bore when said support is adjacent said plate, and means for mounting the circuit board between said plate and support when said plate and support are separated after a terminal is loaded in said holding means whereby movement of said support back toward said plate attaches said terminal to said circuit board.

11. Apparatus as in claim 10 wherein said support includes a collapsible recess for receiving and holding a terminal beneath the surface of said support, and said means for mounting a circuit board is adapted to hold a circuit board upon the surface of said support so that upon movement of said support toward said plate the circuit board is sandwiched between said support and plate and the recess is collapsed to eject the terminal from the recess and drive the terminal into the circuit board.

12. The mehod of mounting a plurality of terminals on a circuit board in a predetermined pattern comprising the steps of positioning a first terminal receiving plate adjacent a second plate, passing a plurality of terminals arranged in said pattern through said second plate to locate the same in said pattern on said terminal receiving plate, separating said plates with the terminals on said receiving plate, positioning a circuit board between said plates when separated, and closing said plates to mount said terminals on the circuit board.

13. The method of claim 12 including the steps of sandwiching the circuit board between said first and second plates and driving said terminals through the circuit board and into said second plate.

14. The method of mounting a plurality of terminals on a circuit board in a predetermined pattern comprising the steps of positioning first and second plates together, passing a plurality of terminals arranged in said pattern through said first plate and seating the terminals on said second plate, separating said plates, positioning a circuit board above said second plate, and moving said second plate and circuit board together to secure the terminals to the circuit board.

15. The method of claim 14 including the step of driving the terminals through the circuit board.

16. A terminal cut-off unit for severing terminals from a carrier strip comprising a base having a front face and an outwardly extending portion below said face, a lip projecting outwardly of said face and extending thereacross above said portion, feed means for indexing a terminal strip across said face with the carrier strip located above said lip adjacent said face and the terminals hanging down from said strip over said lip, a ram located above said portion and movable toward and away therefrom, a cutter on said ram cooperable with said lip to sever said terminals from said strip upon lowering of said ram, a number of terminal receiving bores in said portion immediately below said carrier strip, each bore being located in alignment with a terminal on said strip when the strip is indexed to a cut-off position by said feed means, a comb secured to the lower portion of said ram by a lost motion connection including a spring biasing said comb away from said ram, said comb being located above said lip when said ram is in the up position and having a close fit with said lip upon lowering of the ram, a number of grooves extending along the face of said comb adjacent said base face and toward said portion, each groove being positioned above one of said bores and having sufficient extent to accommodate a terminal during lowering of said ram prior to severing of the terminal from said strip, whereby lowering of said ram moves the comb past said lip to confine each terminal in a recess prior to severing of terminals from the carrier strip, continued lowering of the ram bottoms the comb on said portion so that said recesses form continuations of said bores, further lowering of said ram compressing said spring and lowering said cutter to sever said terminals from said strip so that they fall down their respective bores.

17. A terminal cut-off unit as in claim 16 including confining means carried by said base for confining said carrier strip relative to said lip during severing of the terminals from the carrier strip, such means being movable away from said strip upon raising of said comb above said lip and including biasing means for urging said confining means toward said strip.

18. A terminal cut-off unit as in claim 17 wherein a plurality of grooves and ridges are provided in the face of said cutter adjacent said base and extend toward said portion in line with said terminals, a plurality of grooves and ridges are provided in the face of said confining means and are meshed with said cutter grooves and ridges, said confining means ridges being located immediately above portions of said comb between said comb grooves so that raising of said ram brings said comb into engagement with said confining means to raise the same, and the lower portions of said cutter ridges include cutting surfaces cooperable with said lip for severing terminals from said carrier strip.

19. A terminal cut-off unit as in claim 18 wherein said cut-off surfaces are stepped along said cutter so that different terminals are severed from the carrier strip at different times during lowering of said ram.

20. A terminal cut-off unit as in claim 19 including pneumatic means for providing a blast of air through said comb recesses following severing of terminals from said strip to clean said recesses and facilitate movement of the terminals through said bores.

References Cited

UNITED STATES PATENTS

| | | | |
|---|---|---|---|
| 2,814,802 | 12/1957 | Maximoff | 29—203X |
| 2,970,370 | 2/1961 | Weaver et al. | 29—203X |
| 3,067,902 | 12/1962 | Maximoff et al. | 226—167X |
| 3,439,520 | 4/1969 | Schwartz | 29—203BX |

THOMAS H. EAGER, Primary Examiner

U.S. Cl. X.R.

29—203; 226—167